(12) United States Patent
Liebig

(10) Patent No.: US 6,615,575 B2
(45) Date of Patent: Sep. 9, 2003

(54) METHOD AND APPARATUS FOR REGULATING THE STEAM TEMPERATURE OF THE LIVE STEAM OR REHEATER STEAM IN A COMBINED-CYCLE POWER PLANT

(75) Inventor: Erhard Liebig, Laufenburg (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/267,862

(22) Filed: Oct. 10, 2002

(65) Prior Publication Data

US 2003/0037535 A1 Feb. 27, 2003

Related U.S. Application Data

(63) Continuation of application No. 09/731,928, filed on Dec. 8, 2000, now Pat. No. 6,497,101.

(30) Foreign Application Priority Data

Jan. 19, 2000 (DE) .......................... 100 01 995

(51) Int. Cl.[7] .............................................. F01K 23/10
(52) U.S. Cl. .................................................... 60/39.182
(58) Field of Search ............................ 60/39.182, 772; 122/7 B

(56) References Cited

U.S. PATENT DOCUMENTS 3,164,135 A   1/1965   von Beck
3,942,483 A   3/1976   Laubli
3,969,891 A   7/1976   Aguet
4,989,405 A   2/1991   Duffy et al.
5,069,685 A   12/1991  Bissett et al.
5,370,772 A   12/1994  Arpalahti et al.
5,581,128 A   12/1996  Royle
5,857,322 A   1/1999   Cohn

FOREIGN PATENT DOCUMENTS

| CH | 599 504 | 11/1977 |
| DE | 25 18 158 | 11/1976 |
| GB | 1130767 | 10/1968 |
| WO | 92/21860 | 12/1992 |

*Primary Examiner*—Michael Koczo
(74) *Attorney, Agent, or Firm*—Burns, Doane, Swecker & Mathis, L.L.P.

(57) ABSTRACT

A method for setting or regulating the steam temperature of the live steam and/or reheater steam, in particular under part load, in a combined-cycle power plant and a combined-cycle power plant so regulated. The power-plant has a water/steam cycle including a steam turbine, fired boiler and a means for superheating or reheating the steam generated in the boiler to form live steam or reheater steam, a gas turbine set, and a downstream heat recovery steam generator connected to the water/steam cycle in such a way that steam generated in the heat recovery steam generator is admixed with the live steam or reheater steam. Improved part-load behavior is achieved in that the steam temperature of the live steam and/or reheater steam is set or regulated by setting or regulating the steam temperature of the steam generated in the heat recovery steam generator.

5 Claims, 7 Drawing Sheets

METHOD AND APPARATUS FOR REGULATING THE STEAM TEMPERATURE OF THE LIVE STEAM OR REHEATER STEAM IN A COMBINED-CYCLE POWER PLANT

CROSS-REFERENCE TO RELATED APPLICATIONS

This application is a continuation of U.S. application Ser. No. 09/731,928 filed on Dec. 8, 2000, U.S. Pat. No. 6,497, 101, which claimed priority under 35 U.S.C. §§119 and/or 365 to Application No. 100 01 955.01 filed in Germany on Jan. 19, 2000. The entire content of each of these applications is hereby incorporated by reference.

FIELD OF THE INVENTION

The present invention relates to the field of power plant technology. It relates to a method for setting or regulating the steam temperature of the live steam and/or reheater steam, particularly under part load, in a combined-cycle power plant and to a combined-cycle power plant for carrying out the method.

BACKGROUND

Power plant concepts, in which gas turbine sets having downstream heat recovery steam generators and water/steam cycles having fired boilers and corresponding steam turbines are combined with one another, have been known for some time from the prior art and are used increasingly, above all because of the increased overall efficiency, the additional power output (gas turbine set), along with low investment, and operating flexibility.

A variant of such combined power plant concepts is the combined-cycle power plant, in which the gas turbine set and the water/steam cycle are coupled to one another on the water/steam side. The flue gas discharged by the gas turbine set is conducted through a heat recovery steam generator for the generation of steam and is then discharged into the surroundings. The steam generated in the heat recovery steam generator is fed, for example as live steam and/or reheater steam, into the water/steam cycle at suitable points. Additionally or alternatively, the heat recovery steam generator may also be employed for condensate and/or feedwater preheating. Various types of combined-cycle power plants with different connections between the gas turbine system and the water/steam system are described, for example, in the article by G. Bauer et al., "Das Verbundkraftwerk—eine neue Variante des kombinierten Kraftwerkes", ["The combined-cycle power plant—a new variant of the combined power plant"] VGB Kraftwerkstechnik 73 (1993), No. 2, page 120 ff.

Connection variants are in this case (1) the generation of live steam in the heat recovery steam generator, (2) the generation of reheater steam or medium-pressure steam in the heat recovery steam generator, (3) the generation of low-pressure steam in the heat recovery steam generator, (4) reheating in the heat recovery steam generator or (5) a combination of the first four connection variants with branch flows.

In combined-cycle power plants, essential importance is attached to keeping constant or regulating the live steam temperature, particularly with a view to operation under part load.

In the conventional steam generator, the flue gas temperature falls under part load. As a result of this, the live steam temperature cannot be maintained. However, a fall in the live steam temperature signifies a lowering of the efficiency of the cyclic process. If the steam temperature is to be capable of being regulated over a relatively wide power output range, water injection, together with a corresponding system design, may be provided in a known way. However, this signifies an undesirable loss of energy in the steam generator.

In the gas turbine set, the flue gas parameters depend on the load of the gas turbine and on the climatic conditions. This results in influence being exerted on the generation of steam in the heat recovery steam generator.

Overall, satisfactory part-load properties of a conventional steam generator cannot be achieved in a combined-cycle power plant by means of the above-mentioned known methods. A good part-load behavior is of great importance, particularly when the power plant is used in the medium-load range.

SUMMARY

An object of the invention is, therefore, to provide a method for setting or regulating the steam temperature of the live steam and/or reheater steam, particularly under part load, in a combined-cycle power plant, which leads to markedly improved part-load properties of the combined-cycle power plant, and a combined-cycle power plant for carrying out such a method.

The essence of the invention is to set or regulate the steam temperature of the live steam or reheater steam flowing to the steam turbine by admixing steam from the heat recovery steam generator with this steam, and by setting or regulating the steam temperature of this admixed steam. Improved part-load properties of the combined-cycle power plant can thereby be achieved in a simple way.

A first refinement of the method according to the invention is characterized in that, in order to set or regulate the steam temperature of the steam generated in the heat recovery steam generator, a corresponding change in the feedwater mass flow flowing through the heat recovery steam generator for steam generation is carried out. For this purpose, the feedwater mass flow may be controlled, for example, by the associated feedwater pump, as is known, for example from U.S. Pat. No. 5,237,816.

A second refinement of the method according to the invention is distinguished in that a heat recovery steam generator is used which comprises an evaporator and a downstream superheater and in which a separator is arranged between the evaporator and the superheater. The use of the separator limits the setting and regulating range of the steam temperature toward low temperatures.

The steam generated in the heat recovery steam generator may, within the scope of the invention, be fed into the water/steam cycle at different points:

One possibility is for the fired boiler to be followed by a superheater, for live steam to be generated in the heat recovery steam generator and for the live steam generated in the heat recovery steam generator to be fed into the water/steam cycle downstream of the superheater Another possibility is for the fired boiler to be followed by a superheater with a plurality of successively arranged heat transfer surfaces, for live steam to be generated in the heat recovery steam generator and for the live steam generated in the heat recovery steam generator to be fed into the water/steam cycle between the heat transfer surfaces of the superheater.

Another possibility is for the steam turbine to comprise a high-pressure stage and a medium-pressure stage, for a reheater to be provided between the highpressure stage and the medium-pressure stage, for reheater steam to be generated in the heat recovery steam generator and for the reheater steam generated in the heat recovery steam generator to be fed into the water/steam cycle downstream of the reheater.

It is possible, furthermore, for the steam turbine to comprise a high-pressure stage and a medium-pressure stage, for a reheater with a plurality of successively arranged heat transfer surfaces to be provided between the high-pressure stage and the medium-pressure stage, for reheater steam to be generated in the heat recovery steam generator and for the reheater steam generated in the heat recovery steam generator to be fed into the water/steam cycle between the heat transfer surfaces of the reheater.

The combined-cycle power plant according to the invention for carrying out the method, which combined-cycle power plant comprises a water/steam cycle, in particular with a steam turbine, with a fired boiler and with means for superheating or reheating the steam generated in the boiler to form live steam or reheater steam, and also a gas turbine set with a downstream heat recovery steam generator, the heat recovery steam generator being connected to the water/steam cycle in such a way that steam generated in the heat recovery steam generator is admixed with the live steam or reheater steam, is characterized in that the means for superheating or reheating have a plurality of successively connected heat transfer surfaces, and in that the steam generated in the heat recovery steam generator is fed into the water/steam cycle between the heat transfer surfaces.

Further refinements of the invention may be gathered from the dependent claims.

BRIEF DESCRIPTION OF THE DRAWINGS

The invention will be explained in more detail below by means of exemplary embodiments in conjunction with the drawings in which.

DETAILED DESCRIPTION OF THE PREFERRED EMBODIMENT

Figures 1, 2:
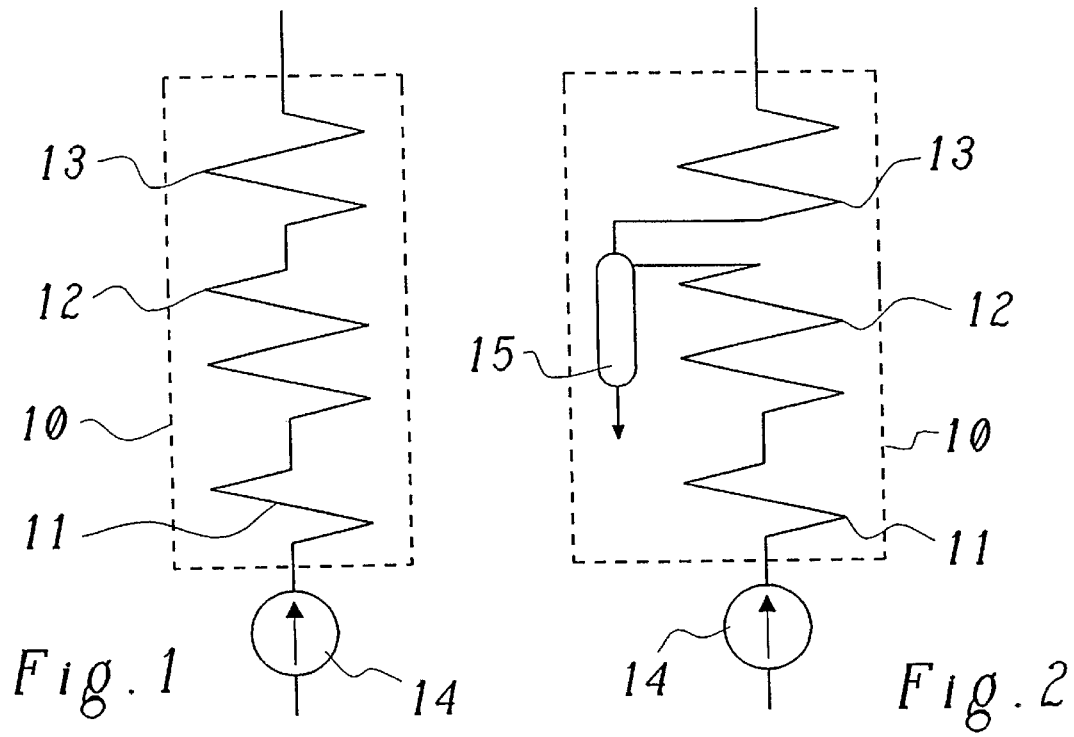
FIG. 1 shows a diagrammatic illustration of a heat recovery steam generator with feedwater pump, such as may be used in the method according to the invention.
FIG. 2 shows the heat recovery steam generator from FIG. 1 with an additional separator between the evaporator and superheater.

The diagrammatic illustration of an exemplary heat recovery steam generator 10 with feedwater pump 14, such as may be used in the method according to the invention, is illustrated in FIG. 1. Feedwater conveyed by the feedwater pump 14 flows through the heat recovery steam generator 10 (from the bottom upward) and is successively first preheated in an economizer 11, then evaporated in an evaporator 12 and thereafter superheated in a superheater 13. The temperature of the steam emerging from the heat recovery steam generator 10 depends critically (assuming a uniform power output of the gas turbine set belonging to the heat recovery steam generator) on the feed, that is to say on the feedwater mass flow: when the feed, that is to say the feedwater mass flow, is increased, the associated steam mass flow rises and the steam temperature falls correspondingly. Conversely, when the feed is reduced, the associated steam mass flow decreases and the steam temperature rises correspondingly. The temperature of the superheated steam generated in the heat recovery steam generator 10 can thereby be set or regulated (on the once-through principle) by setting or regulating the feedwater mass flow. In this case, the feedwater mass flow may be set, for example, by setting the pumping capacity of the feedwater pump 14. If, then, as described further below in connection with FIGS. 6 to 9, steam generated in this way is admixed with the water/steam cycle of the conventional coal block within a combined-cycle power plant, the steam temperature of the live steam and/or reheater steam there can be suitably set and regulated for different load situations.

Figure 3:
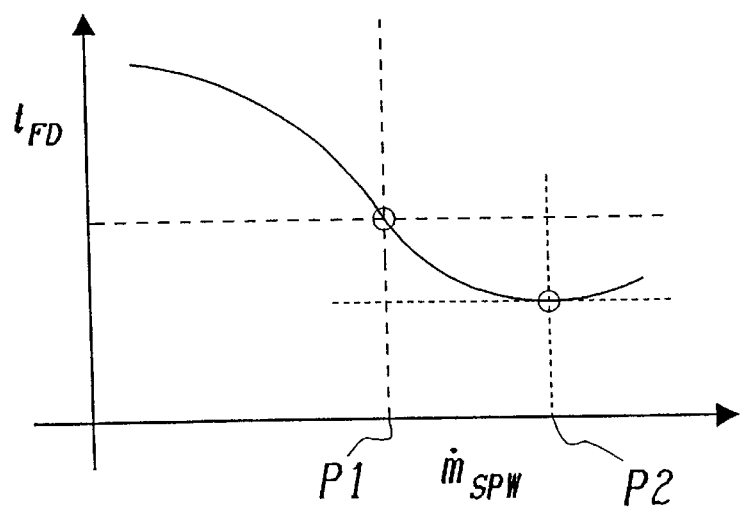
FIG. 3 shows the live steam temperature $t_{FD}$ as a function of the feedwater mass flow $\dot{m}_{SPW}$ in a heat recovery steam generator according to FIG. 2.

In the heat recovery steam generator according to FIG. 1, the entire feedwater mass flow is converted into a corresponding steam mass flow $\dot{m}_{SPW}$. An increase or decrease in the feed, leads, in this case, to a fall or rise in the steam temperature. A behavior deviating from this (see the accompanying graph in FIG. 3 for the live steam temperature $t_{FD}$ as a function of the feedwater mass flow) occurs when, according to FIG. 2, a separator 15 is arranged in the heat recovery steam generator 10' between the evaporator 12 and superheater 13: during normal operation (point P1 in FIG. 3) slightly superheated steam enters the separator 15, which therefore remains dry. There is no water offtake. As a result of the continuous increase in the overfeeding of the steam generator system, that is to say by a rise in the feedwater mass flow (on the right of point P1 in FIG. 3), superheating initially decreases. The live steam temperature $t_{FD}$ falls (the range between point P1 and point P2 in FIG. 3). When the wet-steam zone is reached, moisture is increasingly precipitated in the separator 15 and may be diverted, for example, into a feedwater tank, into a pressure stage located below it, into a preheater or into a condenser. The mass flow arriving at the superheater 13 decreases. As a result of the consequence of decreasing steam-side load on the superheater 13, the live steam temperature $t_{FD}$ begins to rise again (on the right of point P2 in FIG. 3). The commencement of moisture precipitation is designated, here, by the point P2. When, starting from point P1, the feed is reduced (on the left of P1 in FIG. 3), the live steam temperature $t_{FD}$ rises within increasing under-feeding. However, the temperature rise is limited by the limited exhaust gas temperature of the gas.

Figure 4:
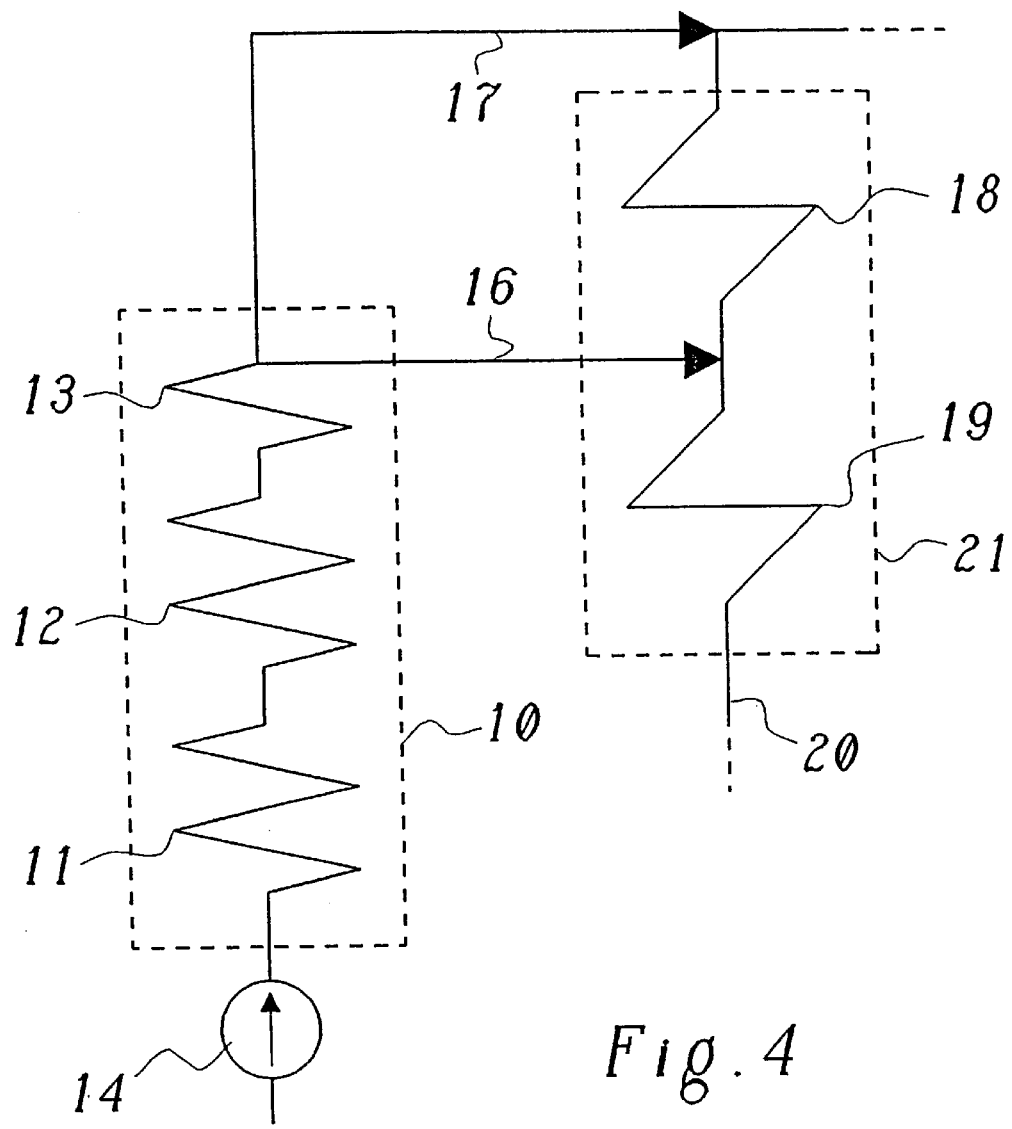
FIG. 4 shows various possibilities for feeding the steam generated in a heat recovery steam generator according to FIG. 1 into the water/steam cycle of the combined-cycle power plant in the method according to the invention.
Figure 5:
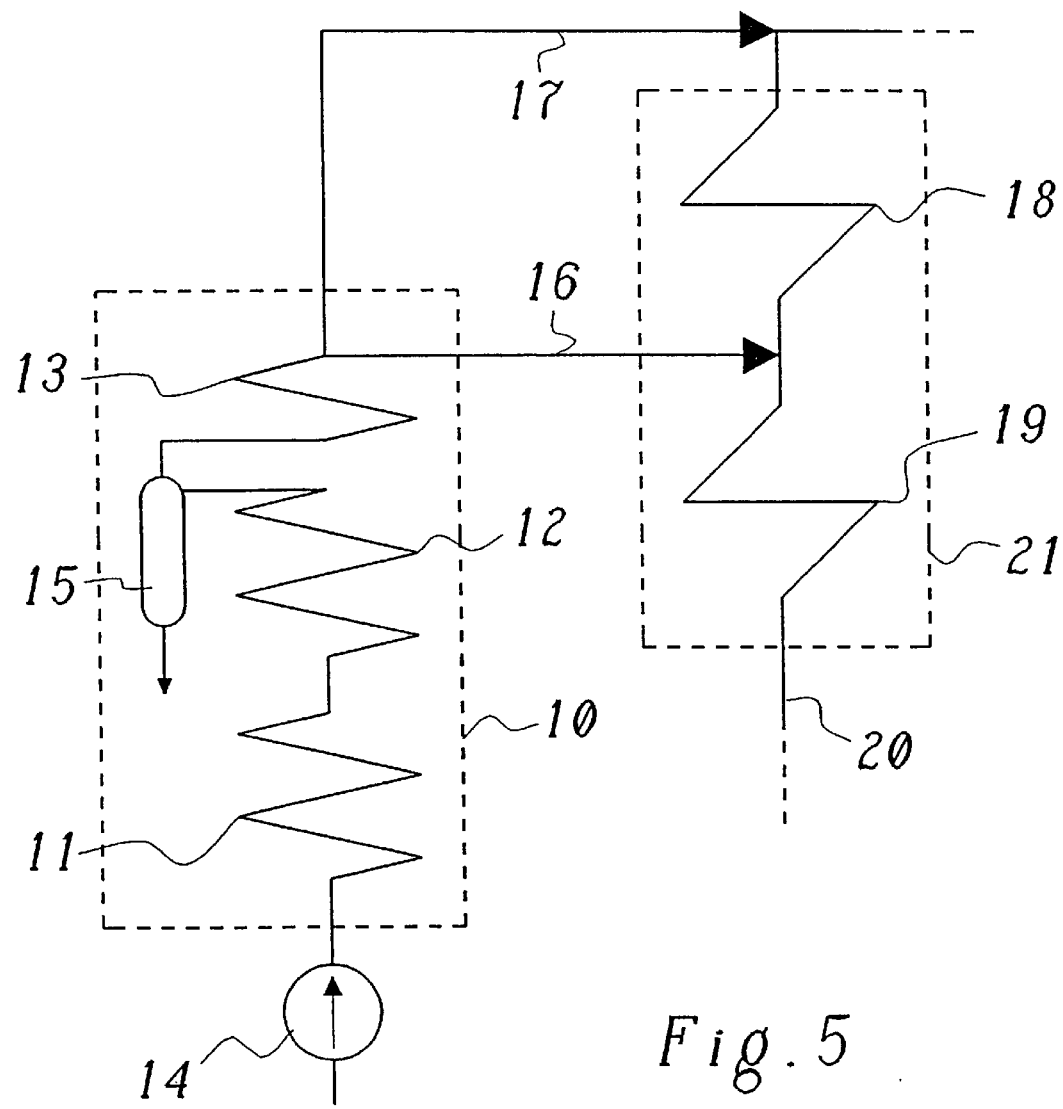
FIG. 5 shows various possibilities for feeding the steam generated in a heat recovery steam generator according to FIG. 2 into the water/steam cycle of the combined-cycle power plant in the method according to the invention.

The connection of the heat recovery steam generators 10 and 10' according to FIGS. 1 and 2 to the water/steam cycle of the coal block can be made in various ways and is reproduced diagrammatically in FIGS. 4 and 5. Arranged in the water/steam cycle 20 is a conventional steam generator with a superheater or reheater 21 which conventionally comprises a plurality of heat transfer surfaces 18, 19. The steam generated in the heat recovery steam generator 10 or 10', then, is admixed via admixing lines 16 or 17, selectively downstream of the heat transfer surfaces 18, 19 or between the heat transfer surfaces 18 and 19, with the steam circulating in the water/steam cycle 20. In this case, the steam temperature of the steam mixture is set and regulated by means of the steam temperature of the steam admixed from the heat recovery steam generator 10 or 10'.

Figure 6:
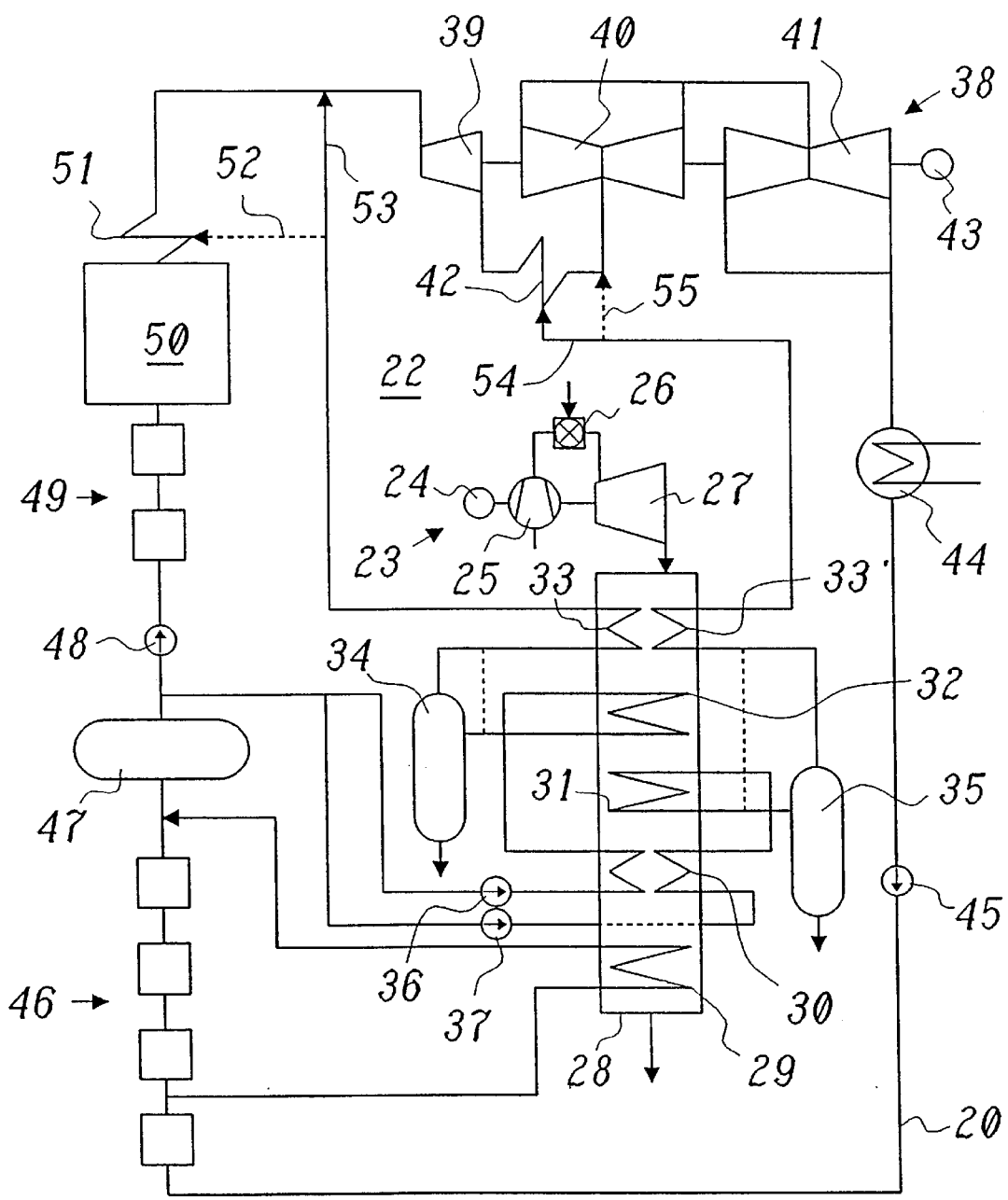
FIG. 6 shows the plant diagram of a combined-cycle power plant according to the invention, in which steam in the high-pressure and medium-pressure range from the heat recovery steam generator is admixed with the live steam or reheater steam in the water/steam cycle.

The plant diagram of the entire combined/cycle power plant is reproduced in four different exemplary embodiments in FIGS. 6 to 9, the same plant parts being designated by identical reference symbols: in the example of FIG. 6, the combined-cycle power plant 22 comprises, in the first place, the water/steam cycle 20, in which a steam turbine 38 with a high-pressure stage 39, a medium-pressure stage 40 and a low-pressure stage 41 is arranged and drives a generator 43. A reheater 42 is provided between the high-pressure stage 39 and the medium pressure stage 40. The low-pressure stage 41 is followed by a condenser 44 in which the exhaust steam condenses. The condensate is pumped into a feedwater tank 47 through a multi-stage condensate preheater 46 by means of a condensate pump 45. The feedwater is conveyed from the feedwater tank 47 by means of a feedwater pump 48 through a multi-stage feedwater preheater 49 into a conventional (coal-fired) boiler 50, and the steam arising is superheated in a downstream superheater 51 in order then to flow as live downstream superheater 51 in order then to flow as live steam to the high-pressure stage 39 of the steam turbine 38.

In addition to the conventional coal block constructed in this way, the combined-cycle power plant 22 comprises a gas turbine set 23 with a downstream heat recovery steam generator 28 which is constructed in a similar way to the heat recovery steam generators 10 and 10' of FIGS. 1 and 2 or 4 and 5. The gas turbine set 23 itself comprises, in a way known per se, a compressor 25 and a turbine 27 which are arranged on a rotor and drive a generator 24 which may be identical to the generator 43. In order to generate the hot flue gases, a combustion chamber 26 is connected between the compressor 25 and turbine 27. The hot exhaust gases from the turbine 27 are conducted (in countercurrent) through the heat recovery steam generator 28 and there discharge heat to the water/steam cycle 20 at different temperature stages.

In the example of FIG. 6, a branch-flow condensate preheater 29 working in parallel with the condensate preheater 46 is provided at the lowest temperature stage. Arranged at the next higher temperature stage is a (split) economizer 30 which preheats feedwater extracted from the water/steam cycle 20 downstream of the feedwater tank 47 by means of two pumps 36, 37.

One branch flow coming from the economizer 30 is led through an evaporator 32 and subsequently through a superheater 33 and is admixed as superheated steam with the live steam of the water/steam cycle 20 via the admixing line 52 or 53 in the superheater 51 or downstream of the superheater 51 (see also FIG. 4 or 5). The other branch flow coming from the economizer 30 is led through an evaporator 31 and subsequently through a superheater 33' and is admixed as superheated steam with the reheater steam of the water/steam cycle 20 via the admixing line 54 or 55 in the reheater 42 or downstream of the reheater 42. In this case, in the heat recovery steam generator 28, the evaporators 31, 32 may be connected to the associated superheaters 33 and 33' either directly or via separators 34, 35, as was explained further above with reference to FIGS. 1 and 2.

Figure 7:
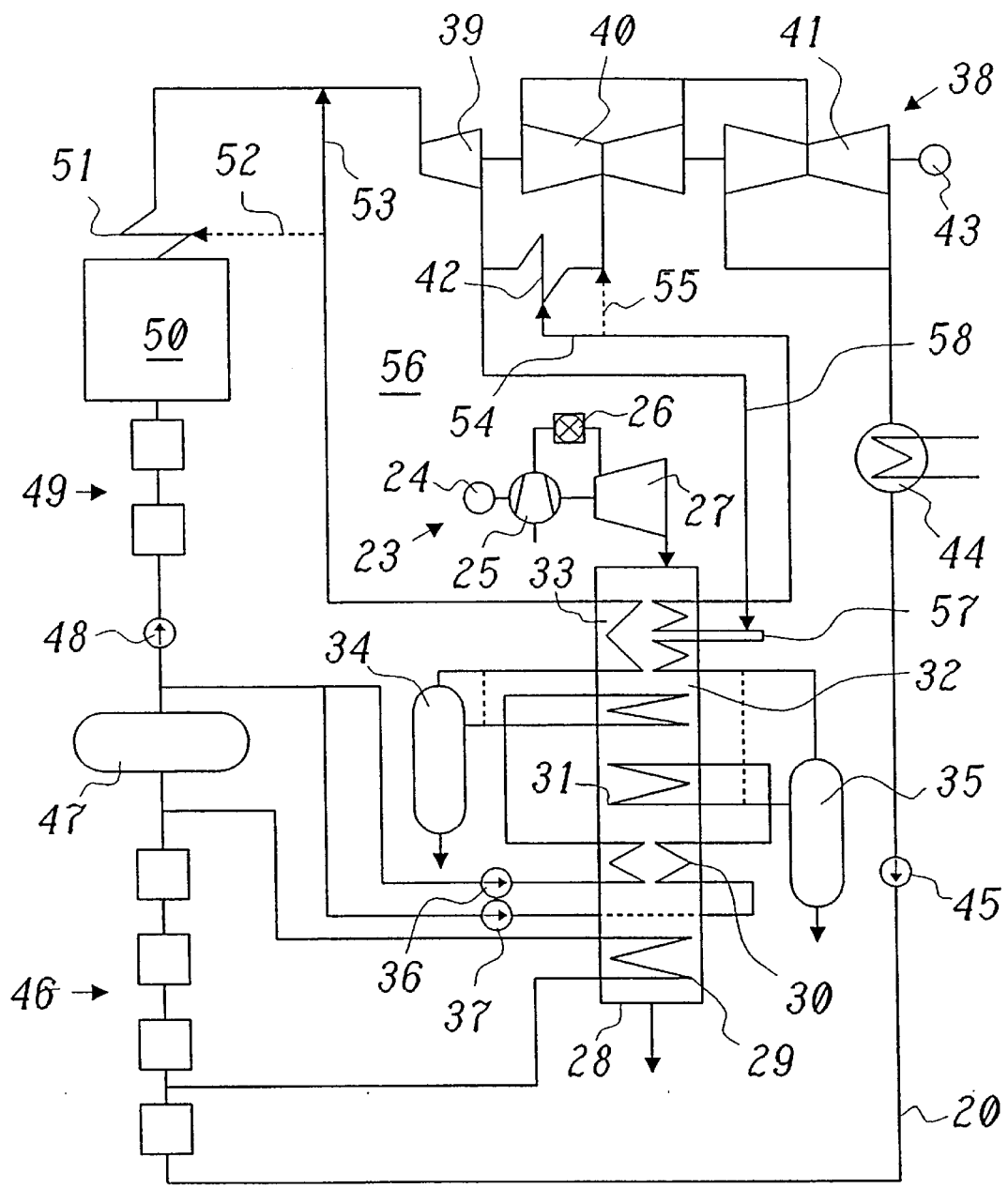
FIG. 7 shows the plant diagram of a combined-cycle power plant comparable to that of FIG. 6, steam being recirculated from the reheater to the heat recovery steam generator.

In the exemplary embodiment of FIG. 7, in the combined-cycle power plant 56 illustrated, the connection of the heat recovery steam generator 28 to the water/steam cycle 20 at the high-pressure level is the same as in FIG. 6. By contrast, at the medium-pressure level, instead of the superheater 33', a two-stage superheater 57 in the heat recovery steam generator 28 is provided into which steam is fed via a recirculation line 58, said steam having been branched off at the inlet of the reheater 42.

Figure 8:
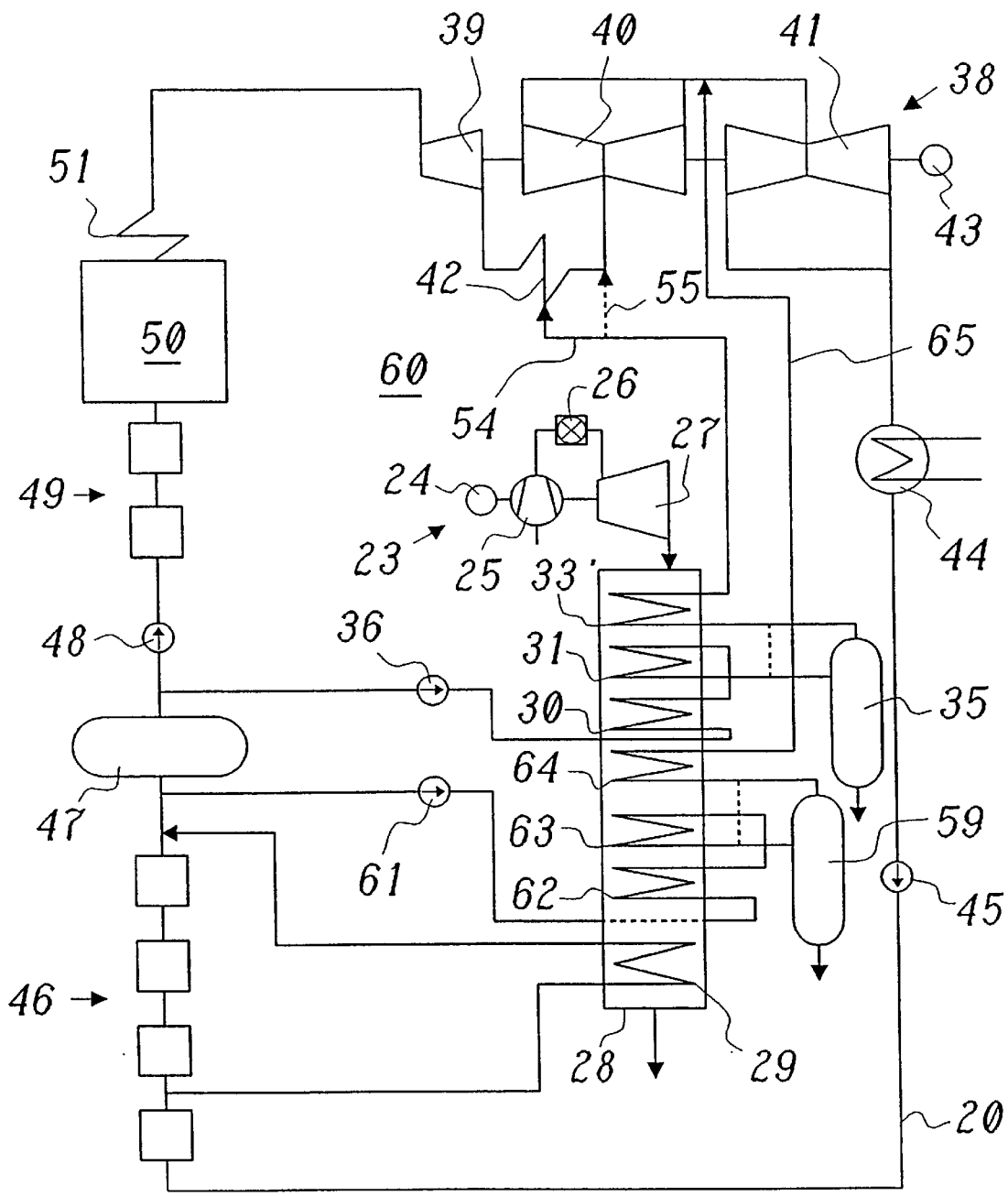
FIG. 8 shows the plant diagram of a combined-cycle power plant according to the invention, in which steam in the medium-pressure and low-pressure range from the heat recovery steam generator is admixed with the reheater steam or low-pressure steam in the water/steam cycle.

In the exemplary embodiment of FIG. 8, in the combined-cycle power plant 60 illustrated, the connection between the heat recovery steam generator 28 and water/steam cycle 20 at the high-pressure level is dispensed with completely. Instead, preheated condensate is branched off upstream of the feedwater tank 47 by means of a pump 61 and is converted via an economizer 62, an evaporator 63 and a superheater 64 into low-pressure steam which is then admixed via an admixing line 65 at the inlet of the low-pressure stage 41 of the steam turbine 38. Here, too, a separator 59 may be provided between the evaporator 63 and the superheater 64.

Figure 9:
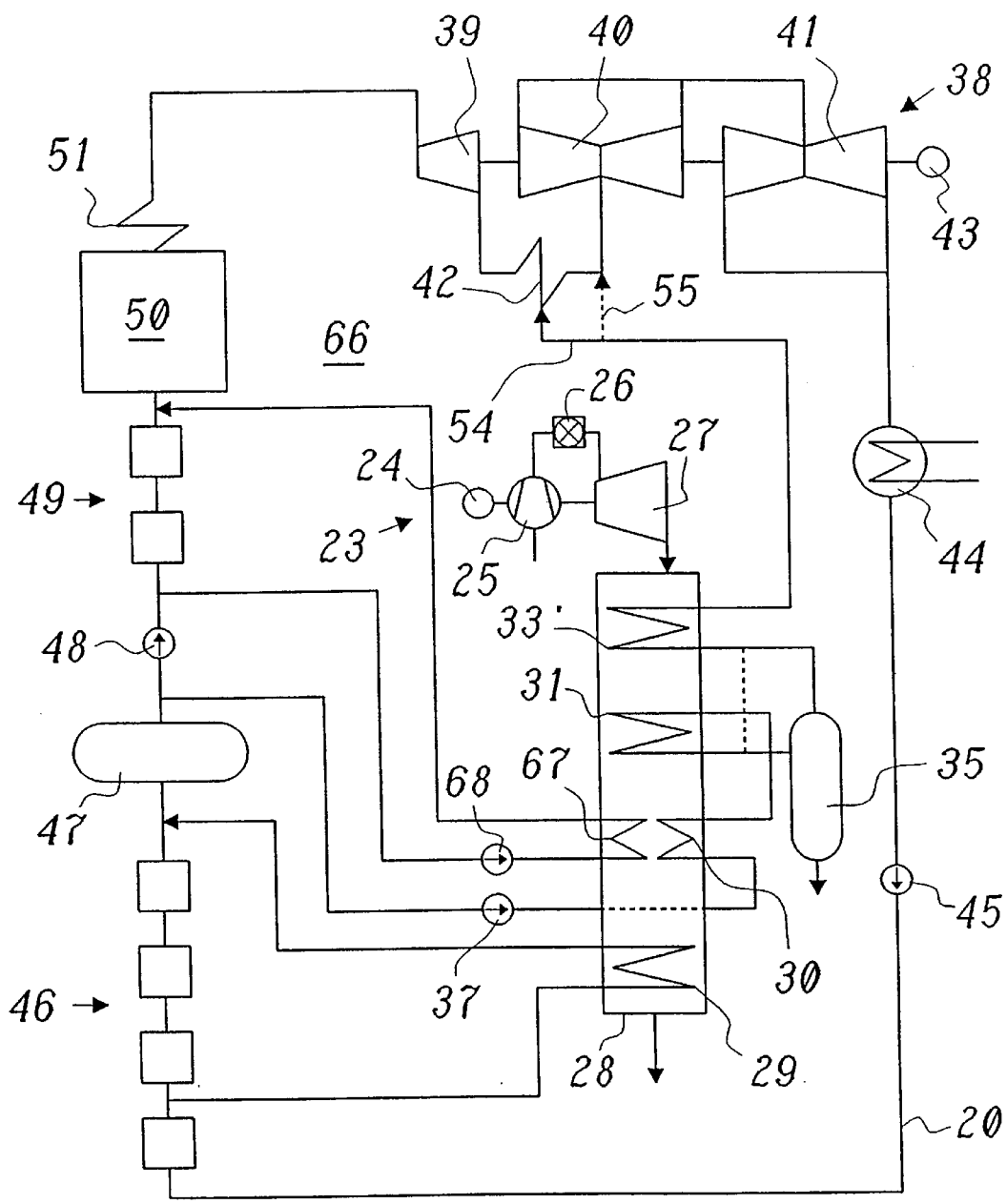
FIG. 9 shows the plant diagram of a combined-cycle power plant according to the invention, in which steam in the medium-pressure range from the heat recovery steam generator is admixed with the reheater steam in the water/steam cycle and the feedwater of the water/steam cycle is simultaneously preheated.

Finally, in the exemplary embodiment of FIG. 9, in addition to the steam mixing at medium-pressure level (heat exchangers 30, 31 and 33'), there is provided in the heat recovery steam generator 28, in parallel with the feedwater preheater 49, feedwater preheating in which feedwater is branched off at the outlet of the feedwater tank 47 by means of a pump 68, is preheated in a feedwater preheater 67 and is subsequently recirculated into the water/steam cycle 20.

---

LIST OF REFERENCE SYMBOLS

| | |
|---|---|
| 10, 10' | Heat recovery steam generator |
| 11 | Economizer |
| 12 | Evaporator |
| 13 | Superheater |
| 14 | Feedwater pump |
| 15 | Separator |
| 16, 17 | Admixing line |
| 18, 19 | Heat transfer surface |
| 20 | Water/steam cycle |
| 21 | Superheater or reheater |
| 22, 56, 60, 66 | Combined-cycle power plant |
| 23 | Gas turbine set |
| 24, 43 | Generator |
| 25 | Compressor |
| 26 | Combustion chamber |
| 27 | Turbine |
| 28 | Heat recovery steam generator |
| 29 | Branch-flow condensate preheater |
| 30, 62 | Economizer |
| 31, 32, 63 | Evaporator |
| 33, 33', 57, 64 | Superheater |
| 34, 35, 59 | Separator |
| 36, 37, 61, 68 | Pump |
| 38 | Steam turbine |
| 39 | High-pressure stage |
| 40 | Medium-pressure stage |
| 41 | Low-pressure stage |

LIST OF REFERENCE SYMBOLS

| | |
|---|---|
| 42 | Reheater |
| 44 | Condenser |
| 45 | Condensate pump |
| 46 | Condensate preheater (multi-stage) |
| 47 | Feedwater tank |
| 48 | Feedwater pump |
| 49 | Feedwater preheater |
| 50 | Boiler (fired) |
| 51 | Superheater |
| 52, . . . , 55, 65 | Admixing line |
| 58 | Recirculation line |
| 67 | Feedwater preheater |
| $\dot{m}_{SPW}$ | Feedwater mass flow |
| P1, P2 | Point |
| $t_{FD}$ | Live steam temperature |

What is claimed is:

1. A combined-cycle power plant operable under part load, comprising:

a water/steam circuit including a fired boiler, a steam turbine connected to a steam output of the fired boiler, and a heater for superheating or reheating steam generated in the fired boiler to form live steam or reheater steam arranged between the fired boiler and an input of the steam turbine;

a gas turbine set including a gas turbine; and a heat recovery steam generator arranged at a hot gas output of the gas turbine and connected to the water/steam circuit in such a way that steam generated in the heat recovery steam generator is admixed with the live steam or reheater steam, wherein a temperature of the steam generated in the heat recovery steam generator is regulated to a temperature different than a temperature of the live steam or reheater steam, and wherein the live steam or reheater steam is admixed with the steam generated in the heat recovery steam generator to regulate the temperature of the live steam or reheater steam.

2. The power plant as claimed in claim 1, wherein regulating the temperature of the steam generated in the heat recovery steam generator comprises changing correspondingly a feedwater mass flow $\dot{m}_{SPW}$ flowing through the heat recovery steam generator.

3. The power plant as claimed in claim 2, wherein the heater is a first superheater arranged between the fired boiler and the steam turbine, and the heat recovery steam generator comprises an evaporator, a second superheater connected to an output of the evaporator, and a steam separator arranged between the evaporator and the second superheater.

4. The combined-cycle power plant according to claim 1, wherein for raising the temperature of the live steam or reheater steam, live steam from the heat recovery steam generator having a higher temperature than the live steam or reheater steam is admixed with the live steam, and for lowering a temperature of the live steam or reheater steam, live steam from the heat recovery steam generator having a lower temperature than the live steam or reheater steam is admixed with the live steam or reheater steam.

5. A combined-cycle power plant operable under part load, comprising:

a water/steam circuit including a fired boiler, a steam turbine connected to a steam output of the fired boiler, and a superheater arranged between the fired boiler and an input of the steam turbine for heating steam generated in the fired boiler to form live steam;

a gas turbine set including a gas turbine; and a heat recovery steam generator arranged at a hot gas output of the gas turbine and connected to the water/steam circuit in such a way that steam generated in the heat recovery steam generator is admixed with the live steam, wherein during operation, live steam is generated in the heat recovery steam generator, the temperature of the live steam generated in the heat recovery steam generator is regulated to a temperature different than a temperature of the live steam from the superheater, and the live steam from the superheater is admixed with the live steam generated in the heat recovery steam generator by feeding the live steam generated in the heat recovery steam generator into the water/steam circuit between the superheater and the steam turbine to regulate the temperature of the live steam from the superheater.

* * * * *